(12) United States Patent
Wagh et al.

(10) Patent No.: US 9,086,966 B2
(45) Date of Patent: Jul. 21, 2015

(54) SYSTEMS, APPARATUSES, AND METHODS FOR HANDLING TIMEOUTS

(71) Applicants: Mahesh Wagh, Portland, OR (US); Su Wei Lim, Klang (MY)

(72) Inventors: Mahesh Wagh, Portland, OR (US); Su Wei Lim, Klang (MY)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 13/840,394

(22) Filed: Mar. 15, 2013

(65) Prior Publication Data

US 2014/0281753 A1  Sep. 18, 2014

(51) Int. Cl.
*G06F 11/07* (2006.01)
*G06F 13/42* (2006.01)
*G06F 1/32* (2006.01)

(52) U.S. Cl.
CPC .......... *G06F 11/0757* (2013.01); *G06F 1/3293* (2013.01); *G06F 11/0745* (2013.01); *G06F 13/4295* (2013.01); *Y02B 60/1228* (2013.01); *Y02B 60/1235* (2013.01)

(58) Field of Classification Search
CPC ............ G06F 13/4295; G06F 11/0757; G06F 1/3293; G06F 11/0745; G06F 1/3203; G06F 1/325; G06F 11/0751; G06F 1/3253; H04L 45/22; H04L 45/28
See application file for complete search history.

(56) References Cited

U.S. PATENT DOCUMENTS

| | | | |
|---|---|---|---|
| 7,353,443 B2 * | 4/2008 | Sharma ........................ | 714/742 |
| 7,730,376 B2 * | 6/2010 | Das Sharma .................. | 714/742 |
| 8,689,028 B2 * | 4/2014 | Diefenbaugh et al. ........ | 713/320 |
| 8,745,296 B2 * | 6/2014 | Guok et al. .................... | 710/74 |
| 8,782,461 B2 * | 7/2014 | Muthrasanallur et al. ..... | 714/4.1 |
| 2008/0005706 A1 * | 1/2008 | Sharma et al. .................. | 716/4 |
| 2008/0178052 A1 * | 7/2008 | Das Sharma .................. | 714/712 |
| 2012/0079312 A1 * | 3/2012 | Muthrasanallur et al. ..... | 714/5.1 |
| 2014/0003451 A1 * | 1/2014 | Wagh et al. .................... | 370/468 |
| 2014/0006670 A1 * | 1/2014 | Wagh ............................ | 710/305 |

* cited by examiner

*Primary Examiner* — Nadeem Iqbal
(74) *Attorney, Agent, or Firm* — Blakely, Sokoloff, Taylor & Zafman LLP

(57) ABSTRACT

Systems, apparatuses, and method for handling timeouts in a link state training sequence are described. All modules of a port undergoing link state training placed into an intermediate state prior to entry into the lowest power state.

20 Claims, 12 Drawing Sheets

SYSTEMS, APPARATUSES, AND METHODS FOR HANDLING TIMEOUTS

FIELD

The embodiments of the invention are related to the field of interconnects between devices.

BACKGROUND

Mobile devices face increasing bandwidth demands for each of its functions as well as an increase of the number of functions integrated into the system. This requires wide bandwidth, low-pin count (serial) and highly power-efficient (network) interfaces that provides sufficient flexibility to be attractive for multiple applications, but which can also be covered with one physical layer technology. The Mobile Industry Processor Interface Alliance (MIPI) defines several high-speed serial link standards.

MIPI's M-PHY (a physical layer technology that is developed for mobile platforms) offers two transmission modes: low speed and high speed, each supporting multiple speed gears, and will also support several power-save states: STALL for the high-speed mode, SLEEP for the low-speed mode, and HIBERN8. STALL and SLEEP are optimized for a quick wakeup in their respective transmission modes, whereas HIBERN8 is a very low-power mode, which has a longer wakeup time. M-PHY is also defined to support optical links.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 6:
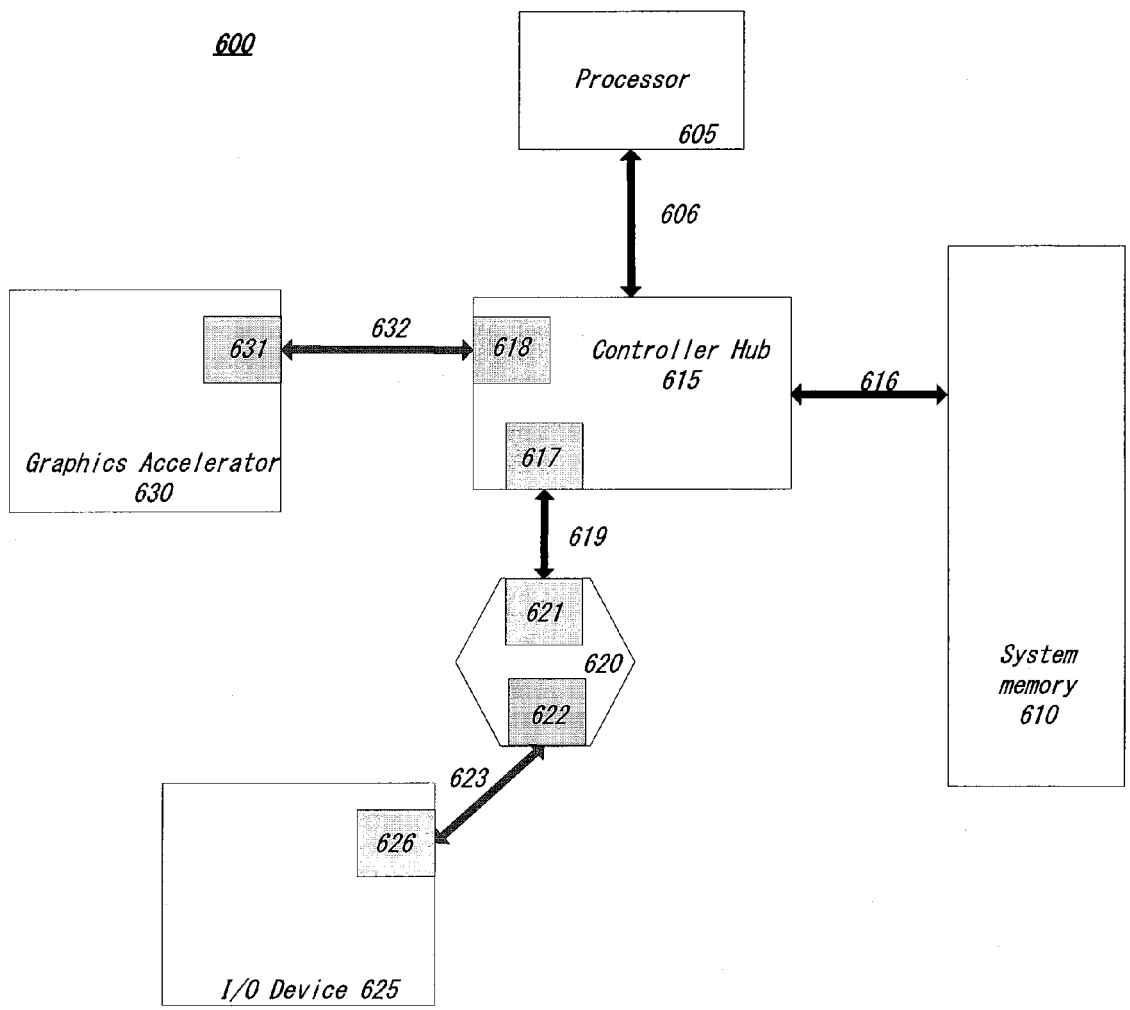
FIG. 6 illustrates an embodiment of a computing system including a peripheral component interconnect express (PCIe) compliant architecture.

Referring to FIG. 6, an embodiment of a fabric composed of point-to-point Links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. Examples of controller hub 615 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output logics 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O logics 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
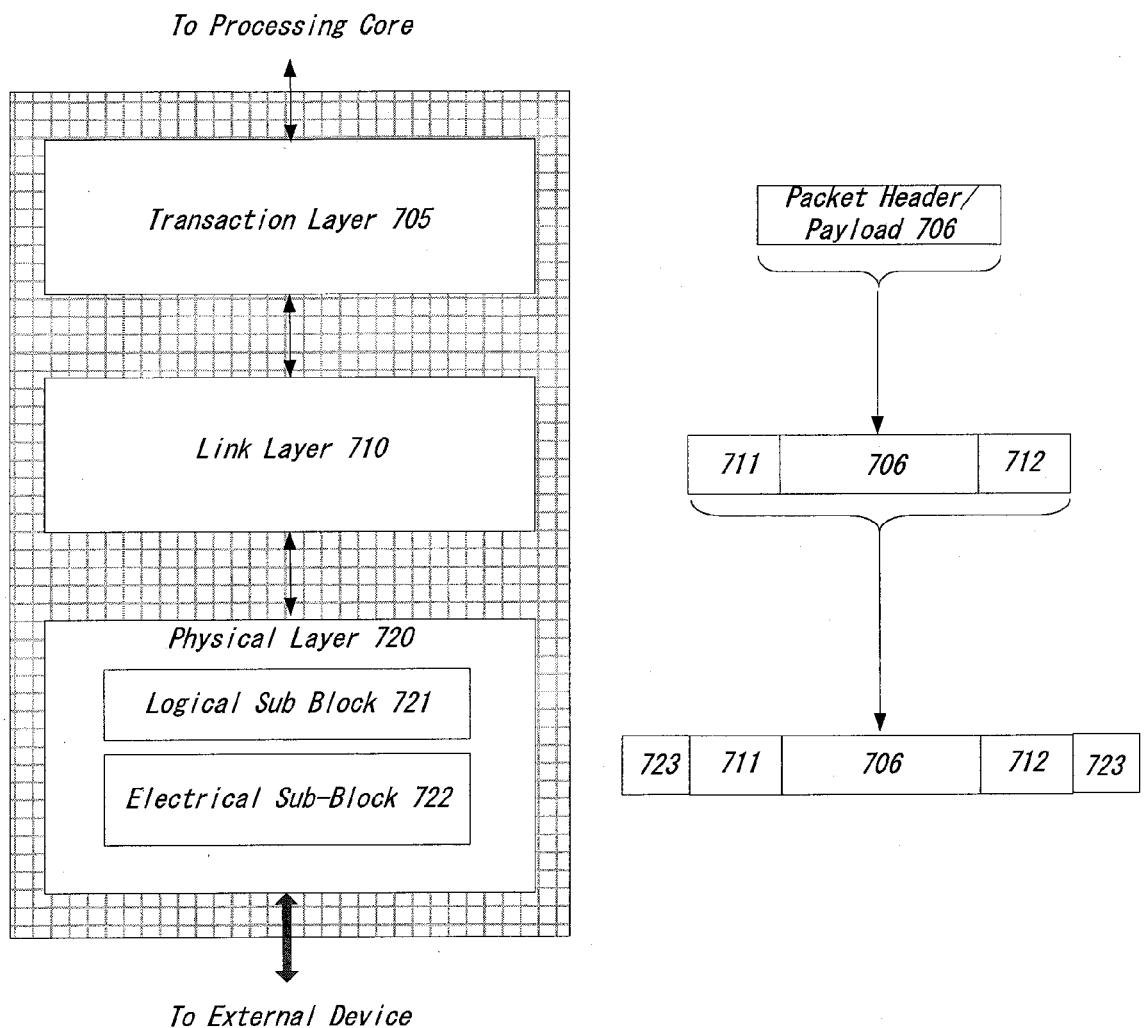
FIG. 7 illustrates an embodiment of a PCIe compliant interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCie stack, a next generation high performance computing interconnect stack, or other layered stack. Although the discussion immediately below in reference to FIGS. 6-9 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 1, may be represented as communication protocol stack 700. Representation as a communication protocol stack may also be referred to as a logic or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
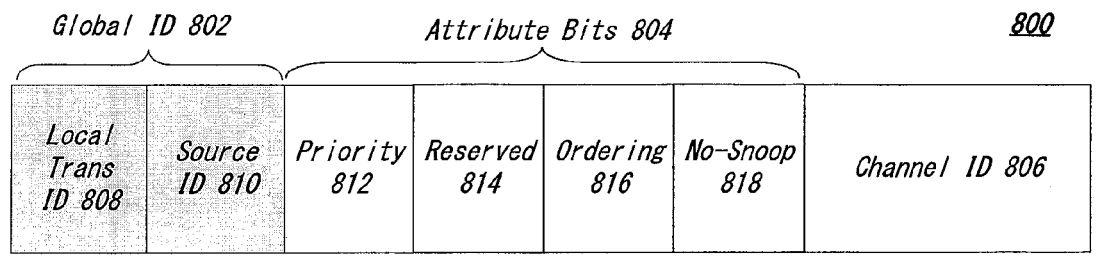
FIG. 8 illustrates an embodiment of a PCIe compliant request or packet to be generated or received within an interconnect architecture.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804 and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8 b/10 b transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 720 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 9:
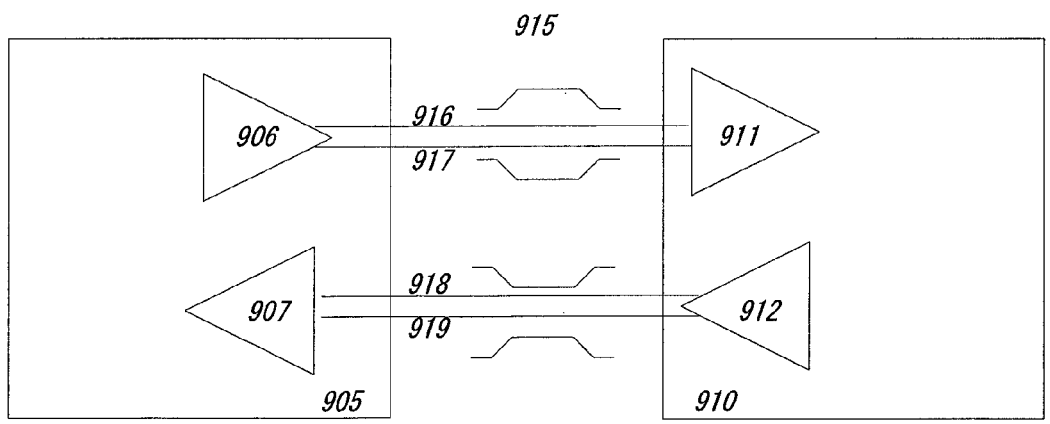
FIG. 9 illustrates an embodiment of a transmitter and receiver pair for a PCIe compliant interconnect architecture.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 10:
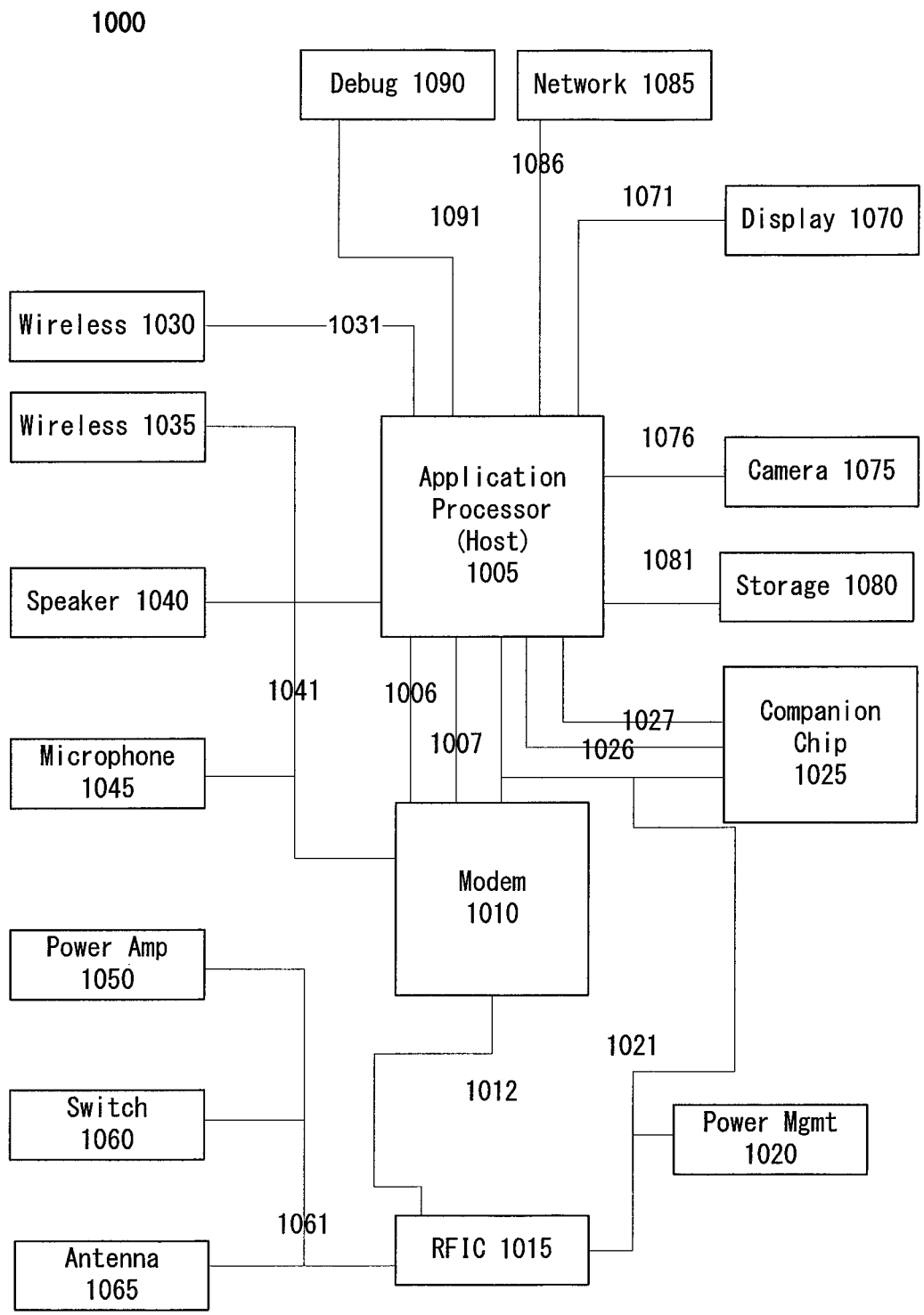
FIG. 10 illustrates an embodiment of a low power computing platform.

Referring to FIG. 10, an embodiment of a low power computing platform is depicted. In one embodiment, low power computing platform 1000 includes a user equipment (UE). A UE refers to, in some embodiments, a device that may be used to communicate, such as a device with voice communication capability. Examples of a UE includes a phone, smartphone, tablet, ultraportable notebook, and a low power notebook. However, a low power computing platform may also refer to any other platform to obtain a lower power operating point, such as a tablet, low power notebook, an ultraportable or ultrathin notebook, a micro-server server, a low power desktop, a transmitting device, a receiving device, or any other known or available computing platform. The illustrated platform depicts a number of different interconnects to couple multiple different devices. Exemplary discussion of these interconnect are provided below to provide options on implementation and inclusion of apparatus' and methods disclosed herein. However, a low power platform 1000 is not required to include or implement the depicted interconnects or devices. Furthermore, other devices and interconnect structures that are not specifically shown may be included.

Starting at the center of the diagram, platform 1000 includes application processor 1005. Often this includes a low power processor, which may be a version of a processor configuration described herein or known in the industry. As one example, processor 1000 is implemented as a system on a chip (SoC). As a specific illustrative example, processor 1000 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note as the processor and SoC technologies from these companies advance, more components illustrated as separate from host processor 1000 may be integrated on an SoC. As a result, similar interconnects (and inventions therein) may be used "on-die."

In one embodiment, application processor 1005 runs an operating system, user interface and applications. Here, application processor 1005 often recognizes or is associated with an Instruction Set Architecture (ISA) that the operating system, user interface, and applications utilize to direct processor 1005's operation/execution. It also typically interfaces to sensors, cameras, displays, microphones and mass storage. Some implementations offload time critical telecom-related processing to other components.

As depicted, host processor 1005 is coupled to a wireless interface 1030, such as WLAN, WiGig, WirelessHD, or other wireless interface. Here an LLI, SSIC, or UniPort compliant interconnect is utilized to couple host processor 1005 and wireless interface 1030.

LLI stands for low latency interface. LLI typically enables memory sharing between two devices. A bidirectional interface transports memory transactions between two devices and allows a device to access the local memory of another device; often this is done without software intervention, as if it was a single device. LLI, in one embodiment, allows three classes of traffic, carrying signals over the link, reducing GPIO count. As an example, LLI defines a layered protocol stack for communication or a physical layer (PHY), such as an MPHY that is described in more detail below.

SSIC refers to SuperSpeed Inter-Chip. SSIC may enable the design of high speed USB devices using a low power physical layer. As an example, a MPHY layer is utilized, while USB 3.0 compliant protocols and software are utilized over the MPHY for better power performance.

UniPro describes a layered protocol stack with physical layer abstraction, providing a general purpose, error-handling, high speed solution for interconnecting a broad range of devices and components: application processors, co-processors, modems, and peripherals, as well as supporting different types of data traffic including control messages, bulk data transfer and packetized streaming. UniPro may support usage of an MPHY or DPHY.

Other interfaces may also couple directly to host processor 1005, such as debug 1090, Network 1085, Display 1070, camera 1075, and storage 1080 through other interfaces that may utilize the apparatus and methods described herein.

Debug interface 1090 and network 1085 communicates with application processor 1005 through a debug interface 1091, e.g. PTI, or network connection, e.g. a debug interface that operates over a functional network connection 1085.

Display 1070 includes one or more displays. In one embodiment, display 1070 includes a display with one or more touch sensors capable of receiving/sensing touch input. Here, display 1070 is coupled to application processor 1005 through display interface (DSI) 1071. DSI 1071 defines protocols between host processor and peripheral devices, which may utilize a DPHY physical interface. It typically adopts pixel formats and a defined command set for video formats and signaling, such as Display Pixel Interface 2 (DPI-2), and control display logic parameters, such as through a Display Command Set (DCS). As an example, DSI 1071 operates at approximately 1.5 Gb/s per lane or to 6 Gb/s.

Camera 1075, in one embodiment, includes an image sensor used for still pictures, video capture, or both. Front and back side cameras are common on mobile devices. Dual-cameras may be used to provide stereoscopic support. As depicted, cameral 1075 is coupled to application processor 1005 through a peripheral interconnect, such as CSI 1076. CSI 1076 defines an interface between a peripheral device (e.g. camera, Image Signal Processor) and a host processor (e.g. 1005, baseband, application engine). In one embodiment, image data transfers are performed over a DPHY, a unidirectional differential serial interface with data and clock signals. Control of the peripheral, in on embodiment, occurs over a separate back channel, such as camera control. As an illustrative example, the speed of CSI may range from 50 Mbps-2 Gbps, or any range/value therein.

Storage 1080, in one example, includes a non-volatile memory used by the application processor 1005 to store large amounts of information. It may be based on Flash technology or a magnetic type of storage, such as a hard-disk. Here, 1080 is coupled to processor 1005 through Universal Flash Storage (UFS) interconnect 1081. UFS 1081, in one embodiment, includes an interconnect that is tailored for low power computing platforms, such as mobile systems. As an example, it provides between 200 and 500 MB/s transfer rate (e.g. 300 MB/s) utilizing queuing features to increase random read/write speeds. In one implementations, UFS 1081 uses the MPHY physical layer and a protocol layer, such as UniPro.

Modem 1010 often stands for Modulator/demodulator. The modem 1010 typically provides the interface to the cellular network. It's capable of communicating with different networks types and different frequencies, depending on which communication standard is used. In one embodiment, both voice and data connections are supported. Modem 1010 is coupled to host 1005 utilizing any known interconnect, such as one or more of LLI, SSIC, UniPro, Mobile Express, etc.

In one embodiment, a control bus is utilized to couple control or data interfaces, such as wireless 1035, speaker 1040, microphone 1045. An example of such a bus is SLIM-bus; a flexible low-power multi-drop interface capable of supporting a wide range of audio and control solutions. Other examples include PCM, I2S, I2C, SPI, and UART. Wireless 1035 includes an interface, such as a short range communication standard between two devices (e.g. Bluetooth or NFC), a navigation system capable of triangulating position and/or time (e.g. GPS), a receiver for analog or radio broadcasts (e.g. FM Radio), or other known wireless interface or standard. Speaker(s) 1040 includes any device to generate sound, such as an electromechanical device to generate ringtones or music. Multiple speakers may be used for stereo or multichannel sound. Microphone 1045 is often utilized for voice input, such as talking during a call.

Radio Frequency Integrated Circuit (RFIC) 1015 is to perform analog processing, such as processing of radio signals, e.g. amplification, mixing, filtering, and digital conversion. As depicted, RFIC 1015 is coupled to modem 1010 through interface 1012. In one embodiment, interface 1012 includes a bi-directional, high-speed interface (e.g. DigRF) that supports communication standards, such as LTE, 3GPP, EGPRS, UMTS, HSPA+, and TD-SCDMA. As a specific example, DigRF utilizes a frame-oriented protocol based on a M-PHY physical layer. DigRF is typically referred to as RF friendly, low latency, low power with optimized pin count that currently operations between 1.5 or 3 Gbps per lane and is configurable with multiple lanes, such as 4 lanes.

Interface 1061 (e.g. a RF control interface) includes a flexible bus to support simple to complex devices. As a specific example, interface 1061 includes a flexible two-wire serial bus, designed for control of RF Front-End components. One bus master may write and read to multiple devices, such as power amplifier 1050 to amplify the RF signal, sensors to receive sensor input, switch logic(s) 1060 to switch between RF signal paths depending on a network mode, and antenna tuners 1065 to compensate for bad antenna conditions or enhancing bandwidth. Interface 1061, in one embodiment, has a group trigger function for timing-critical events and low EMI.

Power management 1020 is used to provide all the different components in the mobile device 1000 with power managed voltage, such as decreasing voltage or increasing it to improve efficiency for components in the mobile device. In one embodiment, it also controls and monitors the charge of the battery and remaining energy. A battery interface may be utilized between power management 1020 and the battery. As an illustrative example, the battery interface includes a single-wire communication between a mobile terminal and smart/low cost batteries.

Figure 11:
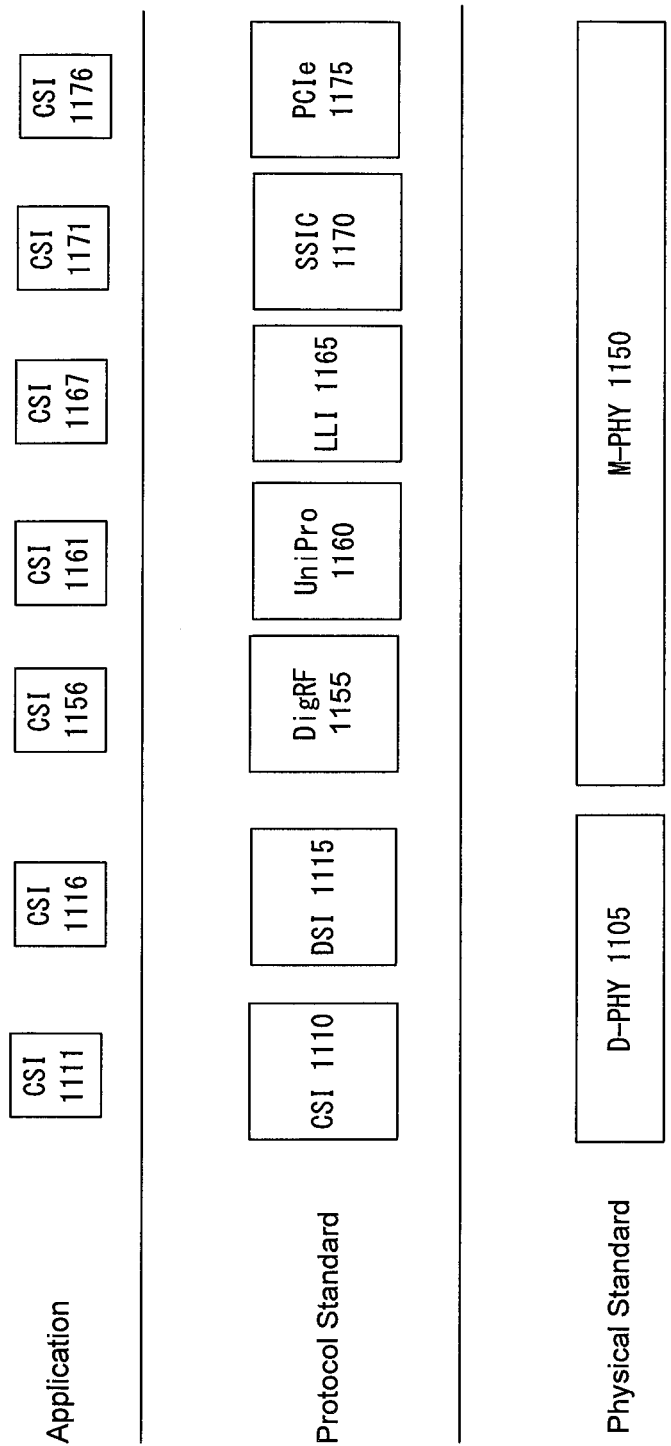
FIG. 11 illustrates an embodiment of different protocols to be transmitted over different physical layers of an interconnect architecture.

FIG. 11 illustrates an embodiment of an exemplary protocol stack for one or more of the interfaces discussed herein. For example, an interconnect may include a physical layer (PHY) to provide electrical/physical communication, while higher-level layers, such as a protocol, transaction, application, or link layer, may provide additional communication functionality. Here, MPHY 11 50 is capable of being implemented with a plurality of different protocol layers, such as DigRF 11 55, UniPro 11 60, LLI 11 65, SSIC 11 70 (i.e. USB 3 protocols), or PCIe 11 75 (i.e. Mobile Express).

Figure 1:
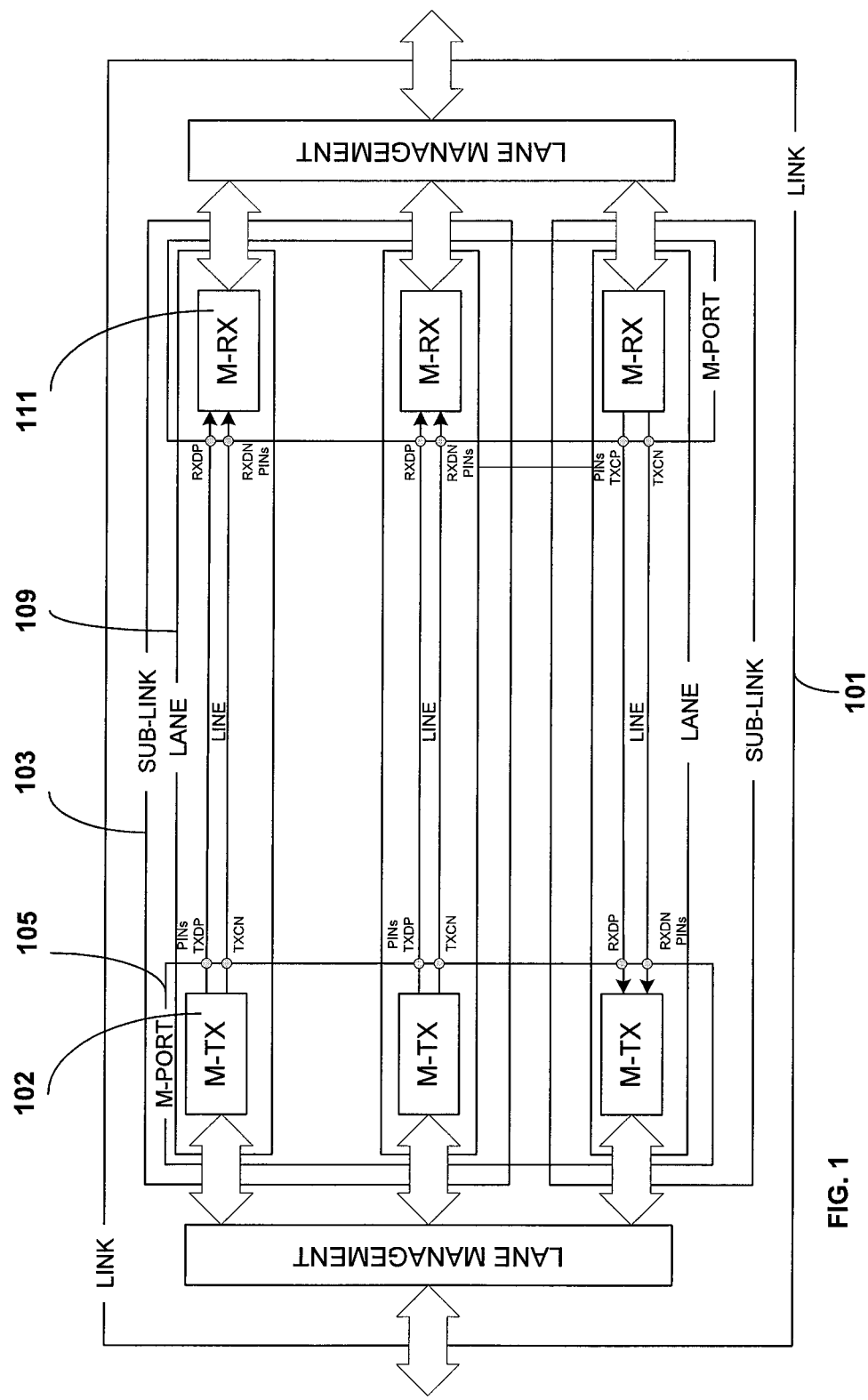
FIG. 1 illustrates an exemplary M-PHY link.

FIG. 1 illustrates an exemplary M-PHY link. A link consists of a downstream port and an upstream port and one or more sublinks 103 which include one or more lanes 109 of an M-TX (M-PHY electrical transmit module) 107, an M-RX (M-PHY electrical receiver module) 111, and a line. In some embodiments, the line is a twisted pair line that couples to two pins on the M-RX and two pins on the M-TX. Each lane 109 has its own interface to the protocol layer. A lane 109 is a unidirectional, single-signal, physical transmission channel used to transport information from point A to point B. Each M-TX or M-RX has one differential electrical output or input line interface, respectively, which corresponds with two signaling pins for each module. A set of M-TXs and M-RXs in a device that composes one interface port is denoted as an M-port 105.

Figure 2:
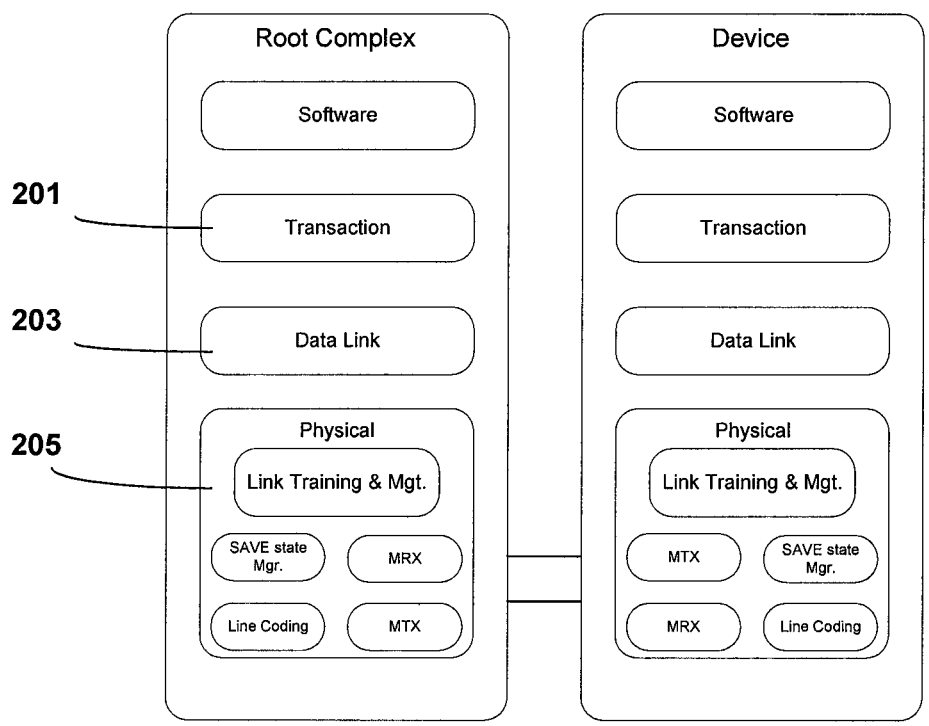
FIG. 2 illustrates an exemplary adaptation of MIPI M-PHY for use in PCI-Express.

FIG. 2 illustrates an exemplary adaptation of MIPI M-PHY for use in PCI-Express (PCIe) (this configuration will be referred to as M-PCIe). M-PCIe includes a transaction layer 201 whose primary responsibility is the assembly and disassembly of Transaction Layer Packets (TLPs). TLPs are used to communicate transactions, such as read and write, as well as certain types of events.

The data link layer 203 serves as an intermediate stage between the transaction layer 201 and the physical layer 205. The primary responsibilities of the data link layer include link management and data integrity, including error detection and error correction.

The physical layer 205 includes all circuitry for interface operation, including driver and input buffers, parallel-to-serial and serial-to-parallel conversion, PLL(s), and impedance matching circuitry. It includes also logical functions related to interface initialization and maintenance including a link training status and state machine (LTSSM). This layer 205 is responsible for converting information received from the data link layer 203 into an appropriate serialized format and transmitting it across the PCI Express Link at a frequency and width compatible with the device connected to the other side of the link. In M-PCIe, the physical layer 205 incorporates M-PHY features such as M-TX and R-TX.

Figure 3:
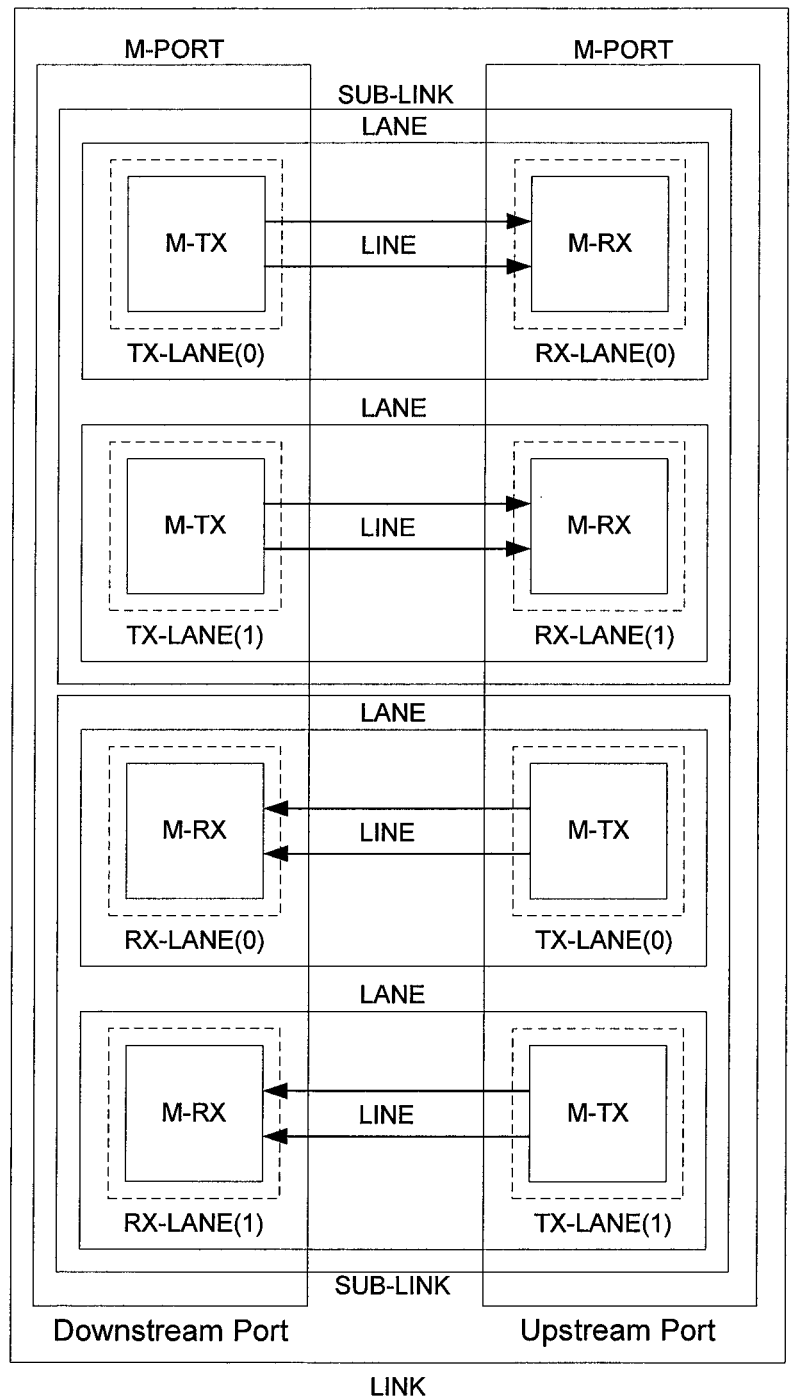
FIG. 3 illustrates an embodiment of a PCIe implementation in a different view.

FIG. 3 illustrates an embodiment of a PCIe implementation in a different view. As shown, a TX-LANE(n) on the M-PORT refers to the M-TX module and transmitter differential pair signals TXDP and TXDN for the transmit SUB-LINK, where n corresponds to the LANE number of the M-TX MODULE supported by the transmit SUB-LINK. The RX-LANE(m) on an M-PORT refers to the M-RX MODULE and receiver differential pair signals RXDP and RXDN for the receive SUB-LINK, where m corresponds to the LANE number of the M-RX MODULE supported by the receive SUB-LINK.

The minimum LINK configuration consists of one LANE for the transmit SUB-LINK and one LANE for the receive SUB-LINK. This combination is identified as LANE PAIR0 and is required for the LINK Initial Discovery and Configuration process. LANE PAIR0 consists of TX-LANE(0) and RX-LANE(0) on Downstream Port and the corresponding RX0-LANE(0) and TX-LANE(0) on Upstream Port.

For any LANE to be "configured," the TX-LANE(x) must be connected to the corresponding remote RX-LANE(x). The numbering of TX-LANE and RX-LANE must be determined statically by the system integrator through implementation-specific mechanisms.

Serial technologies have a Link Training state machine that is used to train the serial links and in a multi-lane configuration assemble multiple lanes to form a link. Part of this training state machine is to manage the links and define timeout conditions where the training state machine will transition the lanes to a known state when forward progress cannot be made.

Figure 4:
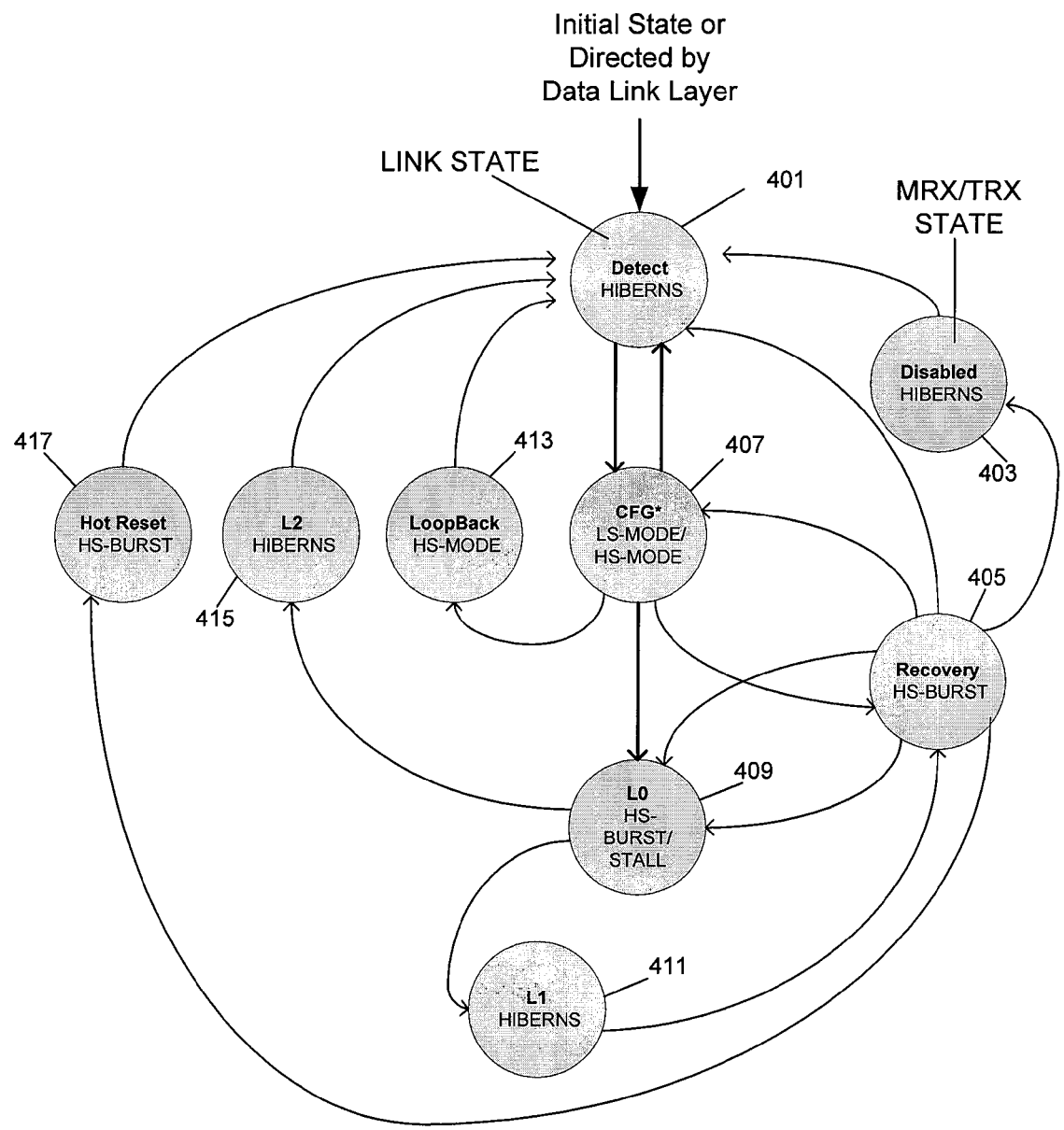
FIG. 4 illustrates the training for M-PCIe which is responsible for multi-lane management of M-PHY lanes.

FIG. 4 illustrates the LTSSM for M-PCIe which is responsible for multi-lane management of M-PHY lanes. The illustration shows PCIe link states and M-PHY line states. The following description uses a convention of odd numbers for PCIe link states and even numbers for M-PHY line states (states of the M-RX and M-TX).

The PCIe Detect state 401 is the initial state after power-on reset and can also be entered from the following states: Configuration 407, Hot-Reset 417, Disabled 403, L2 415, Loopback 413, and Recovery 405. The detect state 401 and Disabled state 403 typically have an M-PHY state of HIBERN8. The HIBERN8 state enables ultra-low power consumption, while maintaining the configuration settings of the line. It is the deepest low-power state without the loss of configuration information.

During the PCIe Configuration state 407, the M-PHY M-RX and M-TX capabilities are discovered and their attributes are configured. Once the M-PHY parameters and link capabilities are configured, both the M-TX and M-RX send and receive data at the configured SUB-LINK width, Rate series, and data RATE. In the Configuration state 401, the line states include Low-Speed mode (LS-MODE) or High-Speed mode (HS-MODE). HS-MODE is a high-speed operational loop that includes the states of STALL and HS-BURST. HS-BURST is the data transmission state of HS-MODE. STALL is a power saving state between HS-BURSTs. LS-MODE has a slower data transmission state than HS-BURST.

Also, LANE-to-LANE de-skew must occur, scrambling can be disabled if permitted, and the Disabled state 403 can be entered.

In the Recovery state 405, both the Transmitter and Receiver are sending and receiving Training Sequences. Recovery allows a Configured LINK to change Link Bandwidth, re-establish bit lock, Symbol lock, and LANE-to-LANE de-skew. The Recovery state 405 is also used for re-configuration of LINK bandwidth.

The L0 state 409 is the normal operational state where data and control packets can be transmitted and received. All power management states are entered from this state. While in L0 409, all configured LANES of the transmit SUB-LINK are permitted to enter STALL state. When one LANE enters STALL all configured LANES of the SUB-LINK must enter STALL. While in L0 409, all configured LANES of the receive SUB-LINK are required to support entering STALL state. SUB-LINK must re-establish bit lock, Symbol lock, and LANE-to-LANE de-skew when exiting from STALL state. Each SUB-LINK can enter and exit STALL independently.

L1 state 411 is intended as a power savings state. Power can be aggressively conserved in the L2 state 415. Most of the Transmitter and Receiver may be shut off. Main power and clocks are not guaranteed, but auxiliary power is available.

The Loopback state 413 is intended for test and fault isolation use. Loopback 413 operates on a per lane basis only and the Loopback Receive LANE must be selected and configured.

The intent of the Disabled state 403 is to allow a Configured link to be disabled until directed. The Hot-Reset state 417 can only be triggered by a Downstream Port. The Downstream Port uses training sequences to propagate Hot-Reset 417.

Figure 5:
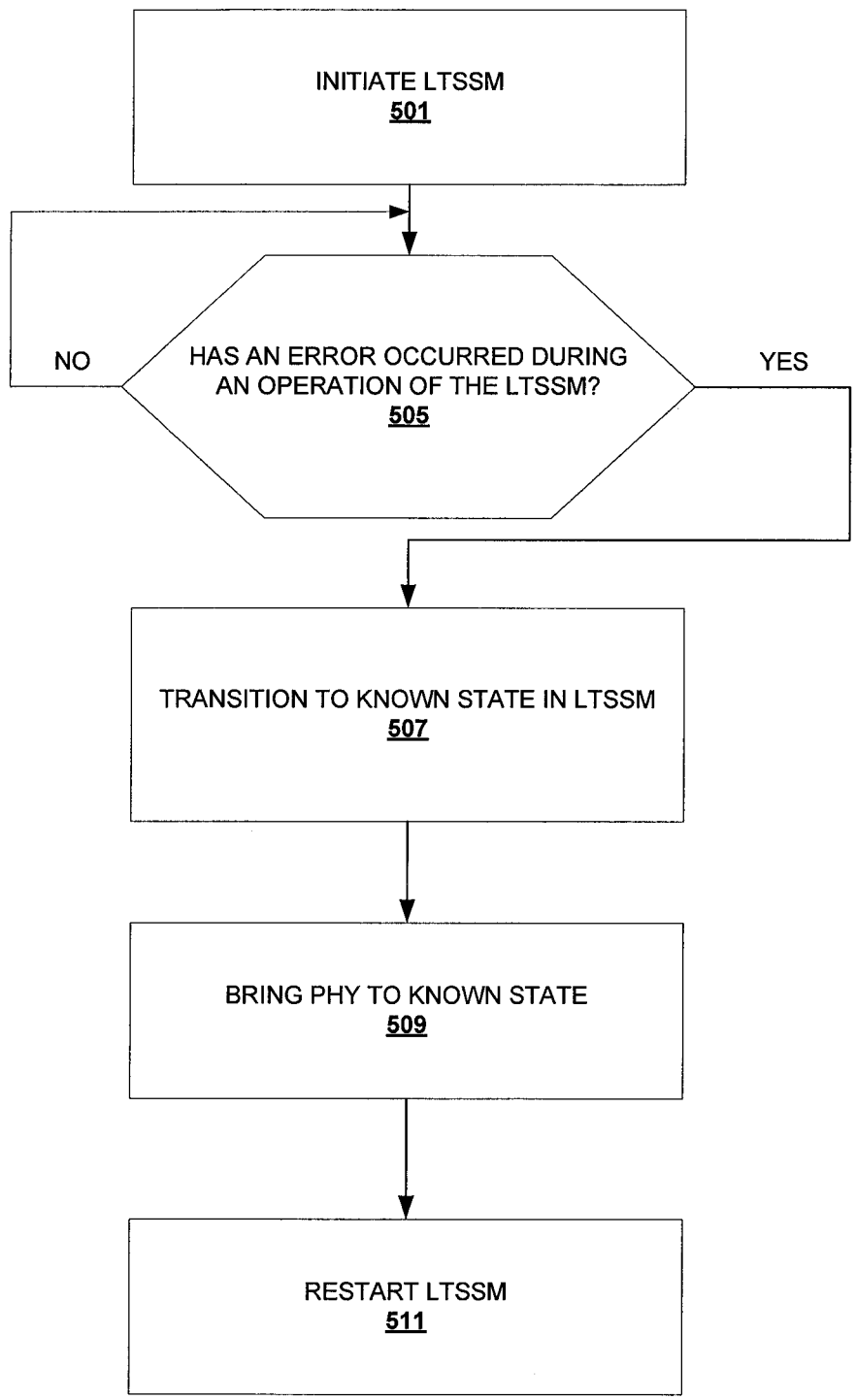
FIG. 5 illustrates an embodiment of a method for handling a timeout error.

Unfortunately, LTSSM is not always successful. FIG. 5 illustrates an embodiment of a method for handling a timeout error in LTSSM. At 501, an LTSSM is instantiated. As noted above, this state machine is used to train serial links and/or form a link from multiple lanes.

The flow of a particular state is performed at 503. Using FIG. 4 as an example, the LTSSM begins at the Detect 401 state.

After Detect 401, the next state is Configuration 407 where the M-PHY M-RX and M-TX capabilities are discovered and their attributes are configured. Figure YYY illustrates an exemplary flow of steps be performed during Configuration 407. Each of these steps is to be completed to successfully configure the links. However, if the flow gets hung up on one of these steps (a timeout condition), then Configuration 407 will fail. If the flow gets through configuration, then the LTSSM goes to a next state, etc.

At each state of the LTSSM (and in some embodiments, each step of the states) a determination of if there has been an error is made at 503. For example, in the Configuration state 407 of Figure YYY a determination of if Cfg.Start, Cfg.Update, etc. has successfully run within an allotted time is made. The timeout value is typically stored within the state machine, but may be stored elsewhere. When there is no error, then the LTSSM continues to run (for example, a next step is performed) at 503.

However, when there is an error, then the LTSSM is halted and transitioned to a known state at 507. In one embodiment, the known state is the M-PHY line state STALL. In some embodiments, prior to entering the STALL state, all of the M-TX modules of the port that went down send at least one electrical idle ordered set (EIOS) to their corresponding M-RX modules on the receiving port. In response, corresponding one or more EIOSs may be sent from M-TX modules on the port that did not go down to the M-RX modules of the port that went down after the initial at least one EIOS is sent and received.

In some embodiments, all of the M-TX and M-RX modules terminate their HS-BURST state prior to entering the STALL state. Typically, on the down port, this termination is in response to receiving or sending an EIOS. For example, in some embodiments, the M-TX of the port that went down will transition to STALL from HS-BURST upon the completion of sending out EIOS and the M-RX of that port will transition from HS-BURST to STALL upon receiving an EIOS from an M-TX of the port that did not go down. In the up port, transition from HS-BURST to STALL occurs for the M-RX module upon receipt of the EIOS from the M-TX of the down port and occurs for the M-TX upon the completion of sending EIOS.

The transition to STALL ensures that the transmitter on the end that timed out goes to STALL. M-PHY also ensures that the remote receiver connected to this transmitter also enters STALL. When the remote end also cannot make progress because it cannot communicate with the local end, that causes a transition to STALL of its transmitter as detailed above.

At 509, after all M-PHY modules are in STALL, they are brought to another known state. In some embodiments, this known state is HIBERN8. To be compliant with the M-PHY standard, the M-RX lanes are transitioned to HIBERN8 prior to the M-TX lanes. In some embodiments, the M-RX lanes of a port enter HIBERN8 immediate after all M-TX and M-RX lanes are in STALL. In some embodiments, the M-TX lanes of a port enter HIBERN8 after a set period of time (for example, 1 us) after all M-TX and M-RX lanes of that port are in STALL. This ensures that there is synchronization between the two ports on when they enter STALL and provides a synchronization point to trigger entry into HIBERN8. In sum, upon a failure in LTSSM, the M-PHY lanes in each port are placed into STALL and then into HIBERN8. This is an improvement over the line-reset approach, which is the lowest level reset mechanism in order to reset the M-RX via the LINE during operation in case of malfunction. While the above has been described in light of LTSSM, this approach may be used for other error handing.

Different embodiments of the invention may be implemented using different combinations of software, firmware, and/or hardware. Thus, the techniques shown in the figures can be implemented using code and data stored and executed on one or more electronic devices (e.g., an end system, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

Note that the apparatus, methods, and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 12:
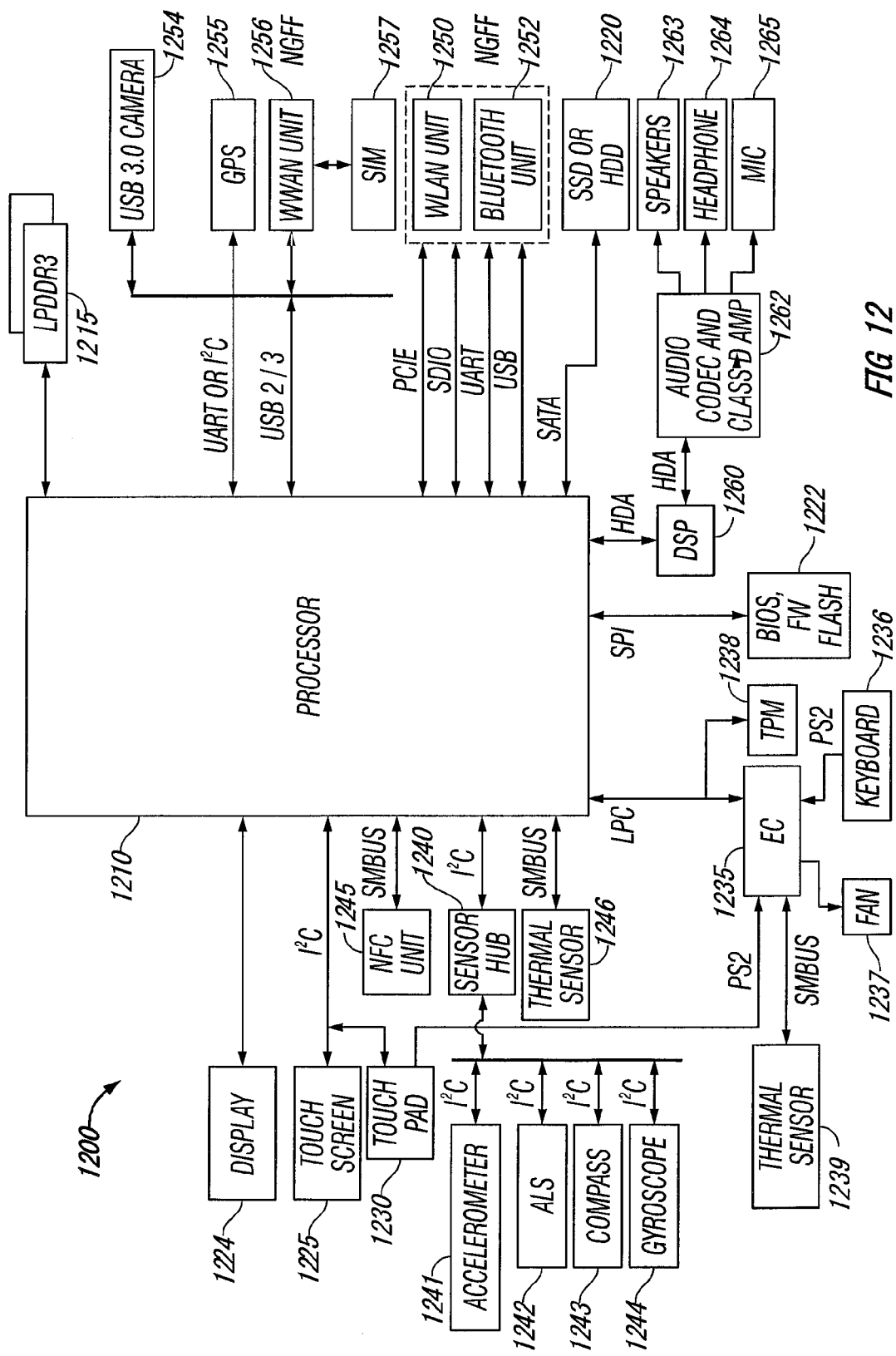
FIG. 12 illustrates an embodiment of a block diagram for a computing system.

Referring now to FIG. 12, a block diagram of components present in a computer system in accordance with an embodiment of the present invention is illustrated. As shown in FIG. 12, system 1200 includes any combination of components. These components may be implemented as ICs, portions thereof, discrete electronic devices, or other logics, logic, hardware, software, firmware, or a combination thereof adapted in a computer system, or as components otherwise incorporated within a chassis of the computer system. Note also that the block diagram of FIG. 12 is intended to show a high level view of many components of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

As seen in FIG. 12, a processor 1210, in one embodiment, includes a microprocessor, multi-core processor, multithreaded processor, an ultra low voltage processor, an embedded processor, or other known processing element. In the illustrated implementation, processor 1210 acts as a main processing unit and central hub for communication with many of the various components of the system 1200. As one example, processor 1200 is implemented as a system on a chip (SoC). As a specific illustrative example, processor 1210 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1210 in one implementation will be discussed further below to provide an illustrative example.

Processor 1210, in one embodiment, communicates with a system memory 1215. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory logics that in turn couple to the motherboard by a given connector. And of course, other memory implementations are possible such as other types of memory logics, e.g., dual inline memory logics (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1220 may also couple to processor 1210. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 12, a flash device 1222 may be coupled to processor 1210, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache logic. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the logic may be accommodated in various locations such as in a mSATA or NGFF slot. As an example, an SSD has a capacity ranging from 120 GB-1 TB.

Various input/output (IO) devices may be present within system 1200. Specifically shown in the embodiment of FIG. 12 is a display 1224 which may be a high definition LCD or LED panel configured within a lid portion of the chassis. This display panel may also provide for a touch screen 1225, e.g., adapted externally over the display panel such that via a user's interaction with this touch screen, user inputs can be provided to the system to enable desired operations, e.g., with regard to the display of information, accessing of information and so forth. In one embodiment, display 1224 may be coupled to processor 1210 via a display interconnect that can be implemented as a high performance graphics interconnect. Touch screen 1225 may be coupled to processor 1210 via another interconnect, which in an embodiment can be an I$^2$C interconnect. As further shown in FIG. 12, in addition to touch screen 1225, user input by way of touch can also occur via a touch pad 1230 which may be configured within the chassis and may also be coupled to the same I$^2$C interconnect as touch screen 1225.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920× 1080 p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1210 in different manners. Certain inertial and environmental sensors may couple to processor 1210 through a sensor hub 1240, e.g., via an I$^2$C interconnect. In the embodiment shown in FIG. 12, these sensors may include an accelerometer 1241, an ambient light sensor (ALS) 1242, a compass 1243 and a gyroscope 1244. Other environmental sensors may include one or more thermal sensors 1246 which in some embodiments couple to processor 1210 via a system management bus (SM Bus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 12, various peripheral devices may couple to processor 1210 via a low pin count (LPC) interconnect. In the embodiment shown, various components can be coupled through an embedded controller 1235. Such components can include a keyboard 1236 (e.g., coupled via a PS2 interface), a fan 1237, and a thermal sensor 1239. In some embodiments, touch pad 1230 may also couple to EC 1235 via a PS2 interface. In addition, a security processor such as a trusted platform logic (TPM) 1238 in accordance with the Trusted Computing Group (TCG) TPM Specification Version 1.2, dated Oct. 2, 2003, may also couple to processor 1210 via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1200 can communicate with external devices in a variety of manners, including wirelessly. In the embodiment shown in FIG. 12, various wireless logics, each of which can correspond to a radio configured for a particular wireless communication protocol, are present. One manner for wireless communication in a short range such as a near field may be via a near field communication (NFC) unit 1245 which may communicate, in one embodiment with processor 1210 via an SMBus. Note that via this NFC unit 1245, devices in close proximity to each other can communicate. For example, a user can enable system 1200 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 12, additional wireless units can include other short range wireless engines including a WLAN unit 1250 and a Bluetooth unit 1252. Using WLAN unit 1250, Wi-Fi™ communications in accordance with a given Institute of Electrical and Electronics Engineers (IEEE) 802.11 standard can be realized, while via Bluetooth unit 1252, short range communications via a Bluetooth protocol can occur. These units may communicate with processor 1210 via, e.g., a USB link or a universal asynchronous receiver transmitter (UART) link. Or these units may couple to processor 1210 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1256 which in turn may couple to a subscriber identity logic (SIM) 1257. In addition, to enable receipt and use of location information, a GPS logic 1255 may also be present. Note that in the embodiment shown in FIG. 12, WWAN unit 1256 and an integrated capture device such as a camera logic 1254 may communicate via a given USB protocol such as a USB 2.0 or 3.0 link, or a UART or I$^2$C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional logic may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional logic may be a WWAN device that can provide support for 3G/4G/LTE and GPS. This logic can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1260, which may couple to processor 1210 via a high definition audio (HDA) link. Similarly, DSP 1260 may communicate with an integrated coder/decoder (CODEC) and amplifier 1262 that in turn may couple to output speakers 1263 which may be implemented within the chassis. Similarly, amplifier and CODEC 1262 can be coupled to receive audio inputs from a microphone 1265 which in an embodiment can be implemented via dual array microphones (such as a digital microphone array) to provide for high quality audio inputs to enable voice-activated control of various operations within the system. Note also that audio outputs can be provided from amplifier/CODEC 1262 to a headphone jack 1264. Although shown with these particular components in the embodiment of FIG. 12, understand the scope of the present invention is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1210 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1235. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1235 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 12, understand the scope of the present invention is not limited in this regard.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security logic such as a TPM can be integrated into a processor or can be a discrete device such as a TPM 2.0 device. With an integrated security logic, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 13:
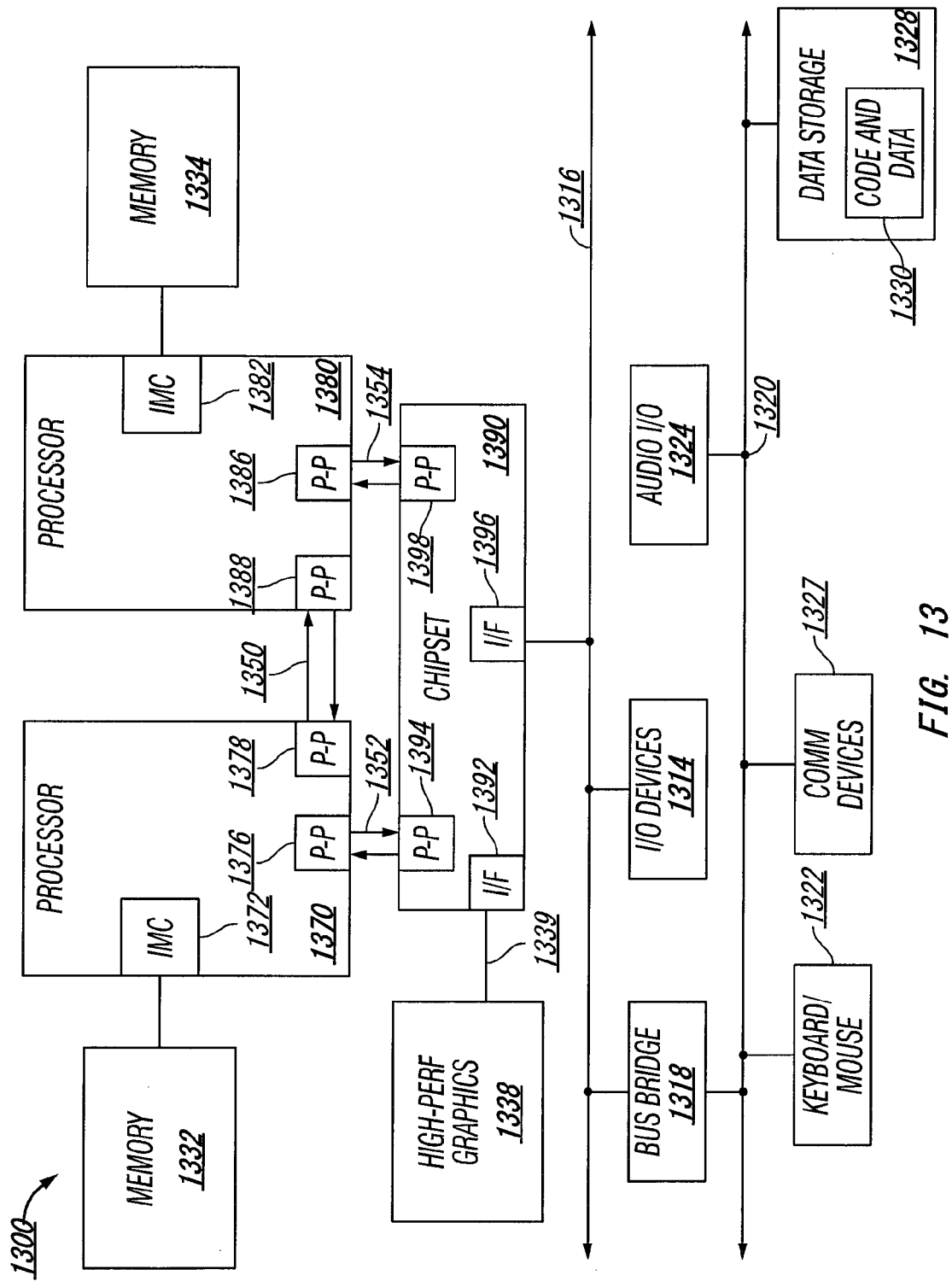
FIG. 13 illustrates another embodiment of a block diagram for a computing system.

Referring now to FIG. 13, shown is a block diagram of a second system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of a processor. In one embodiment, 1352 and 1354 are part of a serial, point-to-point coherent interconnect fabric, such as Intel's Quick Path Interconnect (QPI) architecture. As a result, the invention may be implemented within the QPI architecture.

While shown with only two processors 1370, 1380, it is to be understood that the scope of the present invention is not so limited. In other embodiments, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a pointto-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 each exchange information with a chipset 1390 via individual P-P interfaces 1352, 1354 using point to point interface circuits 1376, 1394, 1386, 1398. Chipset 1390 also exchanges information with a high-performance graphics circuit 1338 via an interface circuit 1392 along a high-performance graphics interconnect 1339.

A shared cache (not shown) may be included in either processor or outside of both processors; yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 are coupled to first bus 1316, along with a bus bridge 1318 which couples first bus 1316 to a second bus 1320. In one embodiment, second bus 1320 includes a low pin count (LPC) bus. Various devices are coupled to second bus 1320 including, for example, a keyboard and/or mouse 1322, communication devices 1327 and a storage unit 1328 such as a disk drive or other mass storage device which often includes instructions/code and data 1330, in one embodiment. Further, an audio I/O 1324 is shown coupled to second bus 1320. Note that other architectures are possible, where the included components and interconnect architectures vary. For example, instead of the point-to-point architecture of FIG. 13, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A logic as used herein refers to any combination of hardware, software, and/or firmware. As an example, a logic includes hardware, such as a micro-controller, associated with a non-transitory medium to store code adapted to be executed by the micro-controller. Therefore, reference to a logic, in one embodiment, refers to the hardware, which is specifically configured to recognize and/or execute the code to be held on a non-transitory medium. Furthermore, in another embodiment, use of a logic refers to the non-transitory medium including the code, which is specifically adapted to be executed by the microcontroller to perform predetermined operations. And as can be inferred, in yet another embodiment, the term logic (in this example) may refer to the combination of the microcontroller and the non-transitory medium. Often logic boundaries that are illustrated as separate commonly vary and potentially overlap. For example, a first and a second logic may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Exemplary embodiments include an apparatus comprising a transmit module, a receive module, and a memory to store a link training status and state machine (LTSSM). Upon encountering an error in the LTSSM, the transmit module and receive module are first transitioned to a first known state of the LTSSM, then transitioned to a second known state, and the LTSSM is restarted after both the transmit and receive modules are in the second known state.

In some embodiments of the apparatus, one or more of the following are implemented either in conjunction with each other or individually: i) the first known state is a power saving state including a STALL state; ii) the second known state is a lowest power consumption state of the LTSSM that maintains configuration settings including a HIBERN8 state; iii) the receive modules must transition to the second known state prior to the transmit modules; and/or iv) the apparatus is a PCI-Express device.

Exemplary embodiments also include a system comprising a first device including a transmit module and a receive module, a second device including a transmit module and a receive module, a first physical line between the transmit module of the first device and the receive module of the second device, a second physical line between the transmit module of the first device and the receive module of the second device, and a memory, in each device, to store a link training status and state machine (LTSSM) in a device, wherein the upon encountering an error in the LTSSM, all transmit modules and all receive modules are first transitioned to a first known state of the LTSSM, then transitioned to a second known state, and the LTSSM is restarted after all of the transmit and receive modules of the devices are in the second known state.

In some embodiments of the system, one or more of the following are implemented either in conjunction with each other or individually: i) the first known state is a power saving state including a STALL state; ii) the second known state is a lowest power consumption state of the LTSSM that maintains configuration settings including a HIBERN8 state; iii) the receive modules must transition to the second known state prior to the transmit modules; and/or iv) the devices are PCI-Express devices.

Exemplary embodiments also include a method comprising initiating a link training status and state machine (LTSSM) in a device, upon encountering an error in the LTSSM, transitioning to a first known state of the LTSSM, transitioning all transmit and receive modules of the device into a second known state, and restarting the LTSSM after all of the transmit and receive modules of the device are in the second known state.

In some embodiments of the method, one or more of the following are implemented either in conjunction with each other or individually: i) the first known state is a power saving state including a STALL state; ii) the second known state is a lowest power consumption state of the LTSSM that maintains configuration settings including a HIBERN8 state; iii) the receive modules must transition to the second known state prior to the transmit modules; and/or iv) the devices are PCI-Express devices.

What is claimed is:

1. An apparatus comprising:
a transmit module;
a receive module; and a memory to store a link training status and state machine (LTSSM) to be executed by hardware logic, wherein the upon encountering an error in the LTSSM, the transmit module and receive module are first transitioned to a first known state of the LTSSM, then transitioned to a second known state, and the LTSSM is restarted after both the transmit and receive modules are in the second known state.

2. The apparatus of claim 1, wherein the first known state is a power saving state.

3. The apparatus of claim 2, wherein the power saving state is a STALL state.

4. The apparatus of claim 1, wherein the second known state is a lowest power consumption state of the LTSSM that maintains configuration settings.

5. The apparatus of claim 4, wherein the second known state is HIBERN8.

6. The apparatus of claim 1, wherein the receive modules must transition to the second known state prior to the transmit modules.

7. The apparatus of claim 1, wherein the apparatus is a PCI-Express device.

8. A system comprising:
 a first device including a transmit module and a receive module;
 a second device including a transmit module and a receive module;
 a first physical line between the transmit module of the first device and the receive module of the second device;
 a second physical line between the transmit module of the first device and the receive module of the second device;
 a memory, in each device, to store a link training status and state machine (LTSSM) in a device to be executed by hardware logic, wherein the upon encountering an error in the LTSSM, all transmit modules and all receive modules are first transitioned to a first known state of the LTSSM, then transitioned to a second known state, and the LTSSM is restarted after all of the transmit and receive modules of the devices are in the second known state.

9. The system of claim 8, wherein the first known state is a power saving state.

10. The system of claim 8, wherein the power saving state is a STALL state.

11. The system of claim 8, wherein the second known state is a lowest power consumption state of the LTSSM that maintains configuration settings.

12. The system of claim 11, wherein the second known state is HIBERN8.

13. The system of claim 8, wherein the receive modules must transition to the second known state prior to the transmit modules.

14. The system of claim 8, wherein the devices are PCI-Express devices.

15. A method comprising:
 initiating a link training status and state machine (LTSSM) in a device;
 upon encountering an error in the LTSSM,
  transitioning to a first known state of the LTSSM,
  transitioning all transmit and receive modules of the device into a second known state, and
  restarting the LTSSM after all of the transmit and receive modules of the device are in the second known state.

16. The method of claim 15, wherein the first known state is a power saving state.

17. The method of claim 16, wherein the power saving state is a STALL state.

18. The method of claim 16, wherein the second known state is a lowest power consumption state of the LTSSM that maintains configuration settings.

19. The method of claim 18, wherein the second known state is HIBERN8.

20. The method of claim 15, wherein the receive modules must transition to the second known state prior to the transmit modules.

\* \* \* \* \*